(12) United States Patent
Deng et al.

(10) Patent No.: US 11,010,001 B2
(45) Date of Patent: May 18, 2021

(54) TOUCH SUBSTRATE, METHOD OF MANUFACTURING THE SAME, AND TOUCH DISPLAY DEVICE

(71) Applicants: HEFEI XINSHENG OPTOELECTRONICS TECHNOLOGY CO., LTD., Hefei (CN); BOE TECHNOLOGY GROUP CO., LTD., Beijing (CN)

(72) Inventors: Dacheng Deng, Beijing (CN); Ting Zeng, Beijing (CN); Ming Zhang, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 12 days.

(21) Appl. No.: 16/560,899

(22) Filed: Sep. 4, 2019

(65) Prior Publication Data
US 2020/0301528 A1 Sep. 24, 2020

(30) Foreign Application Priority Data
Mar. 21, 2019 (CN) .......................... 201910217829.X

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 2203/04111* (2013.01)

(58) Field of Classification Search
None
See application file for complete search history.

(56) References Cited

U.S. PATENT DOCUMENTS

| | | | | |
|---|---|---|---|---|
| 2015/0029142 A1* | 1/2015 | Kim | ...................... | G06F 3/0443 345/174 |
| 2016/0202789 A1* | 7/2016 | Kim | ........................ | G06F 3/044 345/174 |
| 2017/0038890 A1* | 2/2017 | Ma | .......................... | G06F 3/044 |
| 2017/0131813 A1* | 5/2017 | Chen | ..................... | G06F 3/0412 |
| 2018/0284921 A1* | 10/2018 | Nakase | .................... | G06F 3/044 |
| 2019/0105872 A1* | 4/2019 | Nakazawa | ............ | C01G 15/006 |
| 2020/0012364 A1* | 1/2020 | Ye | ........................ | G06F 3/04164 |

* cited by examiner

*Primary Examiner* — Krishna P Neupane
(74) *Attorney, Agent, or Firm* — Kinney & Lange, P.A.

(57) ABSTRACT

The present disclosure provides a touch substrate, a method of manufacturing the same, and a touch display device. The touch substrate includes a base substrate, a plurality of touch electrodes on the base substrate, and a vanishing pattern insulated from the touch electrodes, in which an orthogonal projection of the vanishing pattern on the base substrate covers at least a portion of an orthogonal projection of a gap between adjacent touch electrodes on the base substrate, and a material of the vanishing pattern and a material of the touch electrodes are the same.

17 Claims, 2 Drawing Sheets

TOUCH SUBSTRATE, METHOD OF MANUFACTURING THE SAME, AND TOUCH DISPLAY DEVICE

CROSS-REFERENCE TO RELATED APPLICATION

This application claims a priority to Chinese Patent Application No. 201910217829.X filed on Mar. 21, 2019, the disclosure of which is incorporated in its entirety by reference herein.

TECHNICAL FIELD

The present disclosure relates to the field of touch technology, and in particular to a touch substrate, a method of manufacturing the same and a touch display device.

BACKGROUND

In the related art, in order to realize a flexible touch substrate, a metal mesh is used to prepare a touch electrode of the flexible touch substrate, but the metal mesh has problems of a visible metal and a Moire pattern, so that an Ag composite film can be used instead of a metal mesh to implement the flexible touch substrate.

However, the Ag composite film has a certain absorptivity to light, such that there is a serious shadow elimination problem in the preparation of a touch electrode of a touch substrate using the Ag composite film.

SUMMARY

In one aspect, the present disclosure provides a touch substrate, including a base substrate, a plurality of touch electrodes on the base substrate, and a vanishing pattern insulated from the touch electrodes, in which an orthogonal projection of the vanishing pattern on the base substrate covers at least a portion of an orthogonal projection of a gap between adjacent touch electrodes on the base substrate, and a material of the vanishing pattern and a material of the touch electrodes are the same.

In one example, the touch electrode of the touch substrates are an Ag transparent composite film.

In one example, the orthogonal projection of the vanishing pattern on the base substrate completely covers the orthogonal projection of the gap between adjacent touch electrodes on the base substrate, and the orthogonal projection of the gap between adjacent touch electrodes on the base substrate falls within the orthogonal projection of the vanishing pattern on the base substrate.

In one example, the orthogonal projection of the vanishing pattern on the base substrate coincides with the orthogonal projection of the gap between adjacent touch electrodes on the base substrate.

In one example, the touch substrate is a mutual-capacitive touch substrate, and the touch substrate further includes a touch electrode bridge, two adjacent touch electrodes in longitudinal direction are connected in a same layer, and two adjacent touch electrodes in transverse direction are not connected in the same layer and are connected by the touch electrode bridge in a different layer, and a material of the touch electrode bridge is same as the material of the touch electrode.

In one example, the touch electrode bridge and the vanishing pattern are in a same layer and insulated from each other.

In one example, the Ag transparent composite film includes a light-transmitting silver layer, a first transparent conductive layer covering the light-transmitting silver layer, and a second transparent conductive layer arranged between the base substrate and the light-transmitting silver layer.

For example, the first transparent conductive layer and the second transparent conductive layer are both made of ITO or IZO.

In one example, the touch substrate further includes an optical adhesive arranged on the base substrate; a first insulating layer arranged on the optical adhesive, wherein the touch electrodes are arranged on the first insulating layer, and the second transparent conductive layer arranged between the first insulating layer and the light-transmitting silver layer; a second insulating layer covering the touch electrode, wherein a touch electrode bridge and the vanishing pattern are arranged on the second insulating layer; and a protective substrate arranged on the touch electrode bridge and the vanishing pattern.

An embodiment of the present disclosure further provides a touch display device including the above touch substrate.

An embodiment of the present disclosure further provides a method of manufacturing a touch substrate, including:
providing a base substrate;
forming a plurality of touch electrodes on the base substrate; and
forming a vanishing pattern insulated from the touch electrode with a material same as a material of the touch electrode, wherein an orthogonal projection of the vanishing pattern on the base substrate covers at least a portion of an orthogonal projection of a gap between adjacent touch electrodes on the base substrate.

In one example, the forming the touch electrode includes:
forming the touch electrode with an Ag transparent composite film.

In one example, the touch substrate is a mutual-capacitive touch substrate, and the forming the vanishing pattern insulated from the touch electrode includes:
forming an insulating layer covering the touch electrode after forming the touch electrode;
patterning the insulating layer to form a via hole exposing a portion of the touch electrode; and
forming the vanishing pattern and a touch electrode bridge by a single patterning process on the insulating layer, wherein two adjacent touch electrodes in longitudinal direction are connected in a same layer, two adjacent touch electrodes in transverse direction are not connected in the same layer and are connected by the touch electrode bridge in a different layer, the touch electrode bridge is insulated from the vanishing pattern, and a material of the touch electrode bridge is same as the material of the touch electrode.

In one example, the forming the vanishing pattern and the touch electrode bridge by a single patterning process on the insulating layer includes: forming an Ag transparent composite film on the insulating layer, and patterning the Ag transparent composite film to form the touch electrode bridge and the vanishing pattern.

In one example, the forming the Ag transparent composite film on the insulating layer includes forming a second transparent conductive layer on the insulating layer; forming a light-transmitting silver layer on the second transparent conductive layer; and forming a first transparent conductive layer covering the light-transmitting silver layer, wherein the first transparent conductive layer and the second transparent conductive layer are both made of ITO or IZO.

DETAILED DESCRIPTION

In order to make the technical problems to be solved, the technical solutions, and the advantages of the embodiments of the present disclosure, the present disclosure will be described hereinafter in conjunction with the drawings and specific examples.

As an intelligent human-computer interaction product, a touch screen has been widely used in many fields of social production and life, especially developed most rapidly in the field of consumer electronics (such as a smart phone, a tablet, etc.).

As for a flexible touch substrate, a flexible thin film is generally used as a base, and a touch electrode is formed thereon to finally realize a touch function. A metal mesh may be used to prepare a touch electrode of the flexible touch substrate, but the metal mesh has problems of a visible metal and a Moire pattern, so that an Ag composite film can be used instead of the metal mesh to implement the flexible touch substrate.

Figure 1:
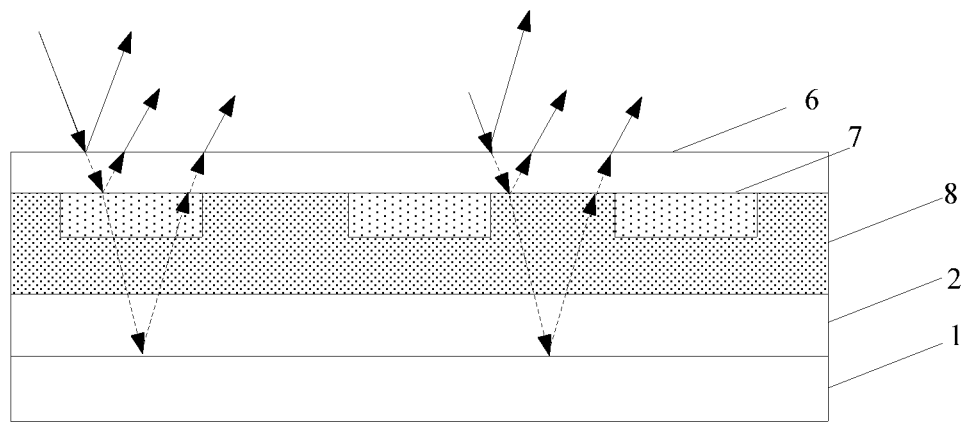
FIG. 1 is a schematic view showing a touch substrate in the related art.

As shown in FIG. 1, in the touch substrate of the related art, a whole shadow elimination film layer 8 is formed on the touch substrate. Taking the touch electrode 7 using ITO as an example, the shadow elimination film layer 8 can use SiONx, in which a refractive index of SiONx is similar to that of ITO, and a absorptivity of ITO to light is low and about 1%. In the region where the touch substrate has no ITO, the transmittance is about 92%, the reflectivity is about 7%, and the scattering rate is 0.5% to 1%. In the region where the touch substrate has the ITO, the transmittance is about 89%, the reflectivity is about 10%, and the scattering rate is 0.5% to 1%. As can be seen, in the region having no ITO and the region having an ITO, the optical properties of the touch substrates are relatively close. Even if there are slight differences, the optical properties of the touch substrates can be improved by the shadow elimination film layer 8. Thus, in the region having a touch electrode 7 and the region having no touch electrode 7, the touch substrate has the same reflection effect on the external light, thereby being capable of achieving a good shadow elimination problem.

However, in the flexible touch substrate, when the touch electrode is formed by using an Ag composite film, in the region where the touch substrate has no Ag composite film, the transmittance is about 92%, the reflectivity is about 7%, the absorptivity is approximately equal to 0, and the scattering rate is 0.5% to 1%; and in the region where the touch substrate has the Ag composite film, the transmittance is about 87%, the reflectivity is about 5%, the absorptivity is 8% to 10%, and the scattering rate is 0.5% to 1%. As can be seen, in the region having no Ag composite film and the region having the Ag composite film, the difference in the optical performance of the touch substrate is relatively large, especially the Ag composite film has a certain absorptivity to light, such that there is a serious shadow elimination problem in the preparation of the touch electrode of the touch substrate using the Ag composite film.

An embodiment of the present disclosure provides a touch substrate, including a base substrate, a plurality of touch electrodes on the base substrate, and a vanishing pattern insulated from the touch electrodes, in which an orthogonal projection of the vanishing pattern on the base substrate covers at least a portion of an orthogonal projection of a gap between adjacent touch electrodes on the base substrate, and a material of the vanishing pattern is same as a material of the touch electrode.

In this embodiment, a vanishing pattern is arranged at a gap between adjacent touch electrodes, and the material of the vanishing pattern of the touch substrate is the same as the material of the touch electrode of the touch substrate, such that the reflection effect at a position where the external light irradiates the touch electrode is the same as the reflection effect at a position where the external light irradiates the vanishing pattern, that is, the reflection effect at the position where the external light irradiates the touch electrode is the same as the reflection effect at the position where the external light irradiates the gap between the adjacent touch electrodes, thereby being capable of achieving a better shadow elimination effect.

In an example, an orthogonal projection of the vanishing pattern on the base substrate may cover a portion of an orthogonal projection of the gap between adjacent touch electrodes on the base substrate, or may completely cover the orthogonal projection of the gap between adjacent touch electrodes on the base substrate, e.g., the orthogonal projection of the gap between adjacent touch electrodes on the base substrate falls within the orthogonal projection of the vanishing pattern on the base substrate.

Specifically, the touch electrode of the touch substrate may use an Ag transparent composite film. The Ag transparent composite film not only has a good conductivity, but also has a good ductility, thereby being applied to a flexible touch substrate. Since the vanishing pattern is the same as the touch electrode, they are both made of an Ag transparent composite film. Therefore, the vanishing pattern and the touch electrode have substantially the same optical performance, such that in the region having a touch electrode or having no touch electrode, the optical properties of the touch substrates are consistent, thereby achieving a better shadow elimination effect.

In this embodiment, the touch substrate may be a mutual-capacitive touch substrate or a self-capacitive touch substrate. When the touch substrate is a mutual-capacitive touch substrate, the touch substrate further includes a touch electrode bridge, two adjacent touch electrodes in longitudinal direction are connected in a same layer, and two adjacent touch electrodes in transverse direction are not connected in the same layer and are connected by the touch electrode bridge in a different layer, and the material of the electrode bridge is the same as the material of the touch electrode, such that the reflection effect at a position where the external light irradiates the touch electrode is the same as the reflection effect at a position where the external light irradiates the touch electrode bridge, thereby being capable of further optimizing the shadow elimination effect of the touch substrate.

In one example, the touch electrode bridge of the touch substrate and the vanishing pattern are located in a same layer and insulated from each other. In this way, the touch pattern bridge and the vanishing pattern can be formed simultaneously by a single patterning process, and the touch electrode bridge and the vanishing pattern are not separately formed, thereby being capable of reducing the number of patterning processes for manufacturing the touch substrate, reducing the production time of the touch substrate, and reducing the production cost of the touch substrate.

In one example, an orthogonal projection of the vanishing pattern on the base substrate coincides with an orthogonal projection of a gap between adjacent touch electrodes on the base substrate, such that the reflection effect of the external light on the whole touch area of the touch substrate is same, thereby being capable of achieving a better shadow elimination effect.

When the touch substrate is a mutual-capacitive touch substrate, and the touch electrode bridge and the vanishing pattern are located in different layers, the orthogonal projection of the vanishing pattern on the base substrate can coincide with the orthogonal projection of the gap between adjacent touch electrodes on the base substrate. When the touch electrode bridge and the vanishing pattern are in the same layer, in order to ensure the insulation between the touch electrode bridge and the vanishing pattern, the touch electrode bridge and the vanishing pattern should be separated by a certain distance, and thus the orthogonal projection of the vanishing pattern on the base substrate may not completely coincide with the orthogonal projection of the gap between the adjacent touch electrodes on the base substrate. However, since the distance between the touch electrode bridge and the vanishing pattern is small, the shadow elimination effect of the touch substrate is not affected. When the touch substrate is a self-capacitive touch substrate, since it is not required to set the touch electrode bridge, and the vanishing pattern and the touch electrode are located in different layers, the orthogonal projection of the vanishing pattern on the base substrate can coincide with the orthogonal projection of the gap between adjacent touch electrodes on the base substrate.

In one example, the Ag transparent composite film may include a first transparent conductive layer, a light-transmitting silver layer and a second transparent conductive layer that are laminated one on another. The first transparent conductive layer may be made of ITO or IZO, and the second transparent conductive layer may be also made of ITO or IZO. Since the thickness of the light-transmitting silver layer is thin and easy to be oxidized, it is necessary to cover the first transparent conductive layer on the light-transmitting silver layer to prevent the light-transmitting silver layer from coming into contact with air and to prevent oxidation of the light-transmitting silver layer. In addition, since the adhesion between the light-transmitting silver layer and the base substrate or the insulating film layer is poor, a second transparent conductive layer may be arranged between the light-transmitting silver layer and the base substrate to increase the adhesion between the light-transmitting silver layer and the base substrate or the insulating film layer.

An embodiment of the present disclosure further provides a touch display device including the above touch substrate. The touch display device may include any product or component having a display function, such as a liquid crystal display, an OLED display, a television, a display, a digital photo frame, a mobile phone, and a tablet computer.

An embodiment of the present disclosure further provides a method of manufacturing a touch substrate, including providing a base substrate and forming a plurality of touch electrodes on the base substrate, and further including:

forming a vanishing pattern insulated from the touch electrode by using a material same as a material of the touch electrode, in which an orthogonal projection of the vanishing pattern on the base substrate is located within an orthogonal projection of a gap between adjacent touch electrodes on the base substrate.

In this embodiment, a vanishing pattern is arranged at a gap between adjacent touch electrodes, and the material of the vanishing pattern of the touch substrate is the same as the material of the touch electrode of the touch substrate, such that the reflection effect at a position where the external light irradiates the touch electrode is the same as the reflection effect at a position where the external light irradiates the vanishing pattern, that is, the reflection effect at a position where the external light irradiates the touch electrode is the same as the reflection effect at a position where the external light irradiates the gap between the adjacent touch electrodes, thereby being capable of achieving a better shadow elimination effect.

In an example of this embodiment, the forming the touch electrode includes:

forming the touch electrode by using an Ag transparent composite film.

Specifically, the touch electrode of the touch substrate may use an Ag transparent composite film. The Ag transparent composite film not only has a good conductivity, but also has a good ductility, thereby being applied to a flexible touch substrate. Since the vanishing pattern is the same as the touch electrode, they are both made of an Ag transparent composite film, the vanishing pattern and the touch electrode have substantially the same optical performance, such that in the region having a touch electrode or having no touch electrode, the optical properties of the touch substrates are consistent, thereby achieving a better shadow elimination effect.

In this embodiment, the touch substrate may be a mutual-capacitive touch substrate or a self-capacitive touch substrate. When the touch substrate is a mutual-capacitive touch substrate, the touch substrate further includes a touch electrode bridge, two adjacent touch electrodes in longitudinal direction are connected in a same layer, and two adjacent touch electrodes in transverse direction are not connected in the same layer and are connected by the touch electrode bridge in a different layer, and the material of the electrode bridge is the same as the material of the touch electrode, such that the reflection effect at a position where the external light irradiates the touch electrode is the same as the reflection effect at a position where the external light irradiates the touch electrode bridge, thereby being capable of further optimizing the shadow elimination effect of the touch substrate.

In one example, the forming the vanishing pattern insulated from the touch electrode includes:

forming an insulating layer covering the touch electrode after forming the touch electrode;

patterning the insulating layer to form a via hole exposing a portion of the touch electrode; and forming the vanishing pattern and a touch electrode bridge by a single patterning process on the insulating layer, in which the touch electrode bridge and the vanishing pattern is independent of each other.

In this embodiment, the touch pattern bridge and the vanishing pattern can be formed simultaneously by a single patterning process, and the touch electrode bridge and the vanishing pattern are not separately formed, thereby being capable of reducing the number of patterning processes for manufacturing the touch substrate, reducing the production time of the touch substrate, and reducing the production cost of the touch substrate.

In one example, the orthogonal projection of the vanishing pattern on the base substrate coincides with the orthogonal projection of the gap between adjacent touch electrodes on the base substrate, such that the reflection effect of the external light on the whole touch area of the touch substrate is same, thereby being capable of achieving a better shadow elimination effect.

When the touch substrate is a mutual-capacitive touch substrate, and the touch electrode bridge and the vanishing pattern are located in different layers, the orthogonal projection of the vanishing pattern on the base substrate can coincide with the orthogonal projection of the gap between adjacent touch electrodes on the base substrate. When the touch electrode bridge and the vanishing pattern are located in the same layer, in order to ensure the insulation between the touch electrode bridge and the vanishing pattern, the touch electrode bridge and the vanishing pattern should be separated by a certain distance, and thus the orthogonal projection of the vanishing pattern on the base substrate may not completely coincide with the orthogonal projection of the gap between the adjacent touch electrodes on the base substrate. However, since the distance between the touch electrode bridge and the vanishing pattern is small, the shadow elimination effect of the touch substrate is not affected. When the touch substrate is a self-capacitive touch substrate, since it is not required to set the touch electrode bridge, and the vanishing pattern and the touch electrode are located in different layers, the orthogonal projection of the vanishing pattern on the base substrate can coincide with the orthogonal projection of the gap between adjacent touch electrodes on the base substrate.

Embodiments of the present disclosure have the following advantageous effects:

In the above technical solution, a vanishing pattern is arranged at a gap between adjacent touch electrodes, and the material of the vanishing pattern of the touch substrate is the same as the material of the touch electrode of the touch substrate, such that the reflection effect at a position where the external light irradiates the touch electrode is the same as the reflection effect at a position where the external light irradiates the vanishing pattern, that is, the reflection effect at a position where the external light irradiates the touch electrode is the same as the reflection effect at a position where the external light irradiates the gap between the adjacent touch electrodes, thereby being capable of achieving a better shadow elimination effect.

The technical solution of the present disclosure will be further described in conjunction with the accompanying drawings and specific embodiments by taking the case that the touch substrate is a mutual-capacitive touch substrate, and the touch transparent electrode is formed by using an Ag transparent composite film as an example. The method of manufacturing the touch substrate of the present embodiment includes the following steps.

Step 1: providing a base substrate, forming a first insulating layer 3 on the base substrate, and forming a pattern of the touch electrodes 7 on the first insulating layer.

In one example, the base substrate may be a rigid substrate or a flexible substrate, in which the rigid substrate may be a glass substrate or a quartz substrate, and the flexible substrate may be a polyimide film.

Figure 4:
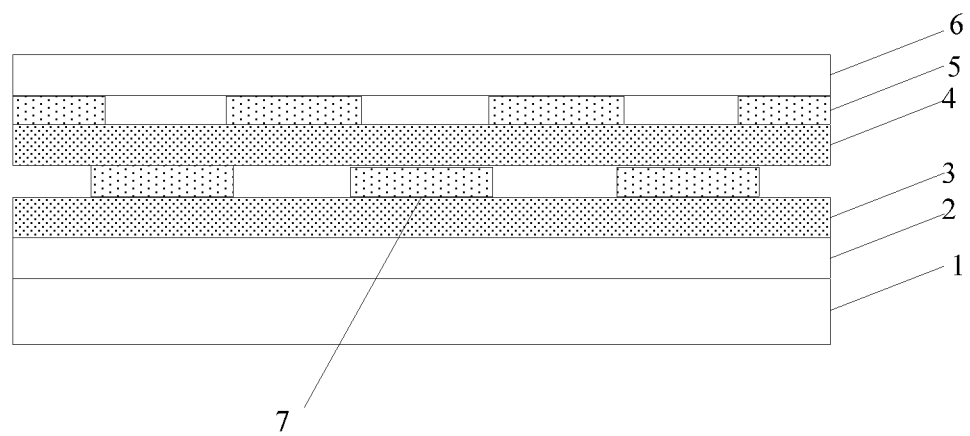
FIG. 4 is a schematic view showing a touch substrate according to an embodiment of the present disclosure.

When the touch substrate is integrated with the display panel, as shown in FIG. 4, in order to simplify the structure, the base substrate of the display panel 1 can be also used as the base substrate of the touch substrate. Specifically, an optical adhesive 2 may be formed on the outside of the display panel 1, and a first insulating layer 3 may be formed on the optical adhesive 2, in which the first insulating layer 3 may be an oxide, a nitride or an oxynitride. Specifically, the material of the first insulating layer 3 may be SiNx, SiOx or Si(ON)x. The first insulating layer 3 may have a single layer structure or a two-layer structure composed of silicon nitride and silicon oxide. The first insulating layer 3 can cover the whole touch region.

Figure 2:
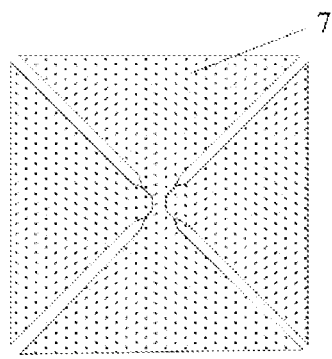
FIG. 2 is a schematic plan view showing a touch electrode according to an embodiment of the present disclosure.

An Ag transparent composite film is formed on the first insulating layer 3. The Ag transparent composite film may be composed of a first transparent conductive layer, a light-transmitting silver layer and a second transparent conductive layer that are laminated one on another. The Ag transparent composite film is patterned, as shown in FIG. 2, to form a plurality of mutually independent touch electrodes 7.

The first transparent conductive layer may be made of ITO or IZO, and the second transparent conductive layer may be also made of ITO or IZO. Since the thickness of the light-transmitting silver layer is thin and easy to be oxidized, it is necessary to cover the first transparent conductive layer on the light-transmitting silver layer to prevent the light-transmitting silver layer from coming into contact with air and to prevent oxidation of the light-transmitting silver layer. In addition, since the adhesion between the light-transmitting silver layer and the first insulating layer 3 is poor, a second transparent conductive layer may be arranged between the light-transmitting silver layer and the first insulating layer 3 to increase the adhesion between the light-transmitting silver layer and the first insulating layers 3.

When the light transmittance of the light-transmitting silver layer can reach 80% or more, and the touch substrate and the display panel are laminated one on another, the touch transparent electrode is formed by using an Ag transparent composite film, and the display effect of the display panel is substantially not affected. The absorptivity of light by the Ag transparent composite film is generally about 10%, which is higher than that of the common ITO film (by about 1%).

Of course, the base substrate of the touch substrate of the embodiment may not be also used as the base substrate of the display panel, and a separate base substrate may be used.

Step 2: forming a second insulating layer 4 covering the touch electrode 7.

The second insulating layer 4 may be an oxide, a nitride or an oxynitride compound. Specifically, the material of the second insulating layer 4 may be SiNx, SiOx or Si(ON)x. The second insulating layer 4 may have a single layer structure or a two-layer structure composed of silicon nitride and silicon oxide. The second insulating layer 4 can cover the whole touch region. The second insulating layer 4 is patterned to form a via hole exposing the touch electrode 7.

Step 3: forming the touch electrode bridge 9 and the vanishing pattern 5.

Figure 3:
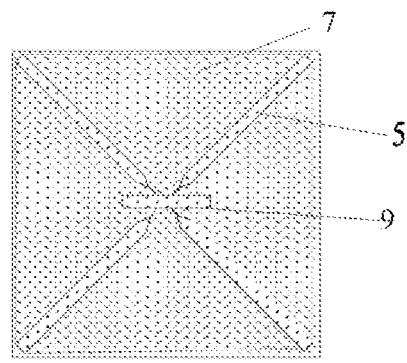
FIG. 3 is a schematic view showing a vanishing pattern and a touch electrode bridge according to an embodiment of the present disclosure.

An Ag transparent composite film is formed on the second insulating layer 4, and the Ag transparent composite film may be composed of a first transparent conductive layer, a light-transmitting silver layer and a second transparent conductive layer that are laminated one on another. The Ag transparent composite film is patterned, as shown in FIG. 3, to form a touch electrode bridge 9 and a vanishing pattern 5. The touch electrode bridge 9 and the vanishing pattern 5 are independent of each other and insulated from each other, and the touch electrode bridge 9 is connected to adjacent touch electrodes 7.

The first transparent conductive layer may be made of ITO or IZO, and the second transparent conductive layer may be also made of ITO or IZO. Since the thickness of the light-transmitting silver layer is thin and easy to be oxidized, it is necessary to cover the first transparent conductive layer on the light-transmitting silver layer to prevent the light-transmitting silver layer from coming into contact with air and to prevent oxidation of the light-transmitting silver layer. In addition, since the adhesion between the light-transmitting silver layer and the second insulating layer 4 is poor, a second transparent conductive layer may be arranged between the light-transmitting silver layer and the second insulating layer 4 to increase the adhesion between the light-transmitting silver layer and the second insulating layers 4.

When the light transmittance of the light-transmitting silver layer can reach 80% or more, and the touch substrate and the display panel are laminated one on another, the touch electrode bridge 9 and the vanishing pattern 5 are formed by using an Ag transparent composite film, and the display effect of the display panel is not affected substantially.

Step 4: forming a protective substrate 6.

The protective substrate 6 may be a rigid substrate or a flexible substrate, in which the rigid substrate may be a glass substrate or a quartz substrate, and the flexible substrate may be a polyimide film. The protective substrate 6 is capable of protecting the touch electrode bridge 9 and the vanishing pattern 5.

The touch substrate of the embodiment shown in FIG. 4 can be obtained through the above technical solution, as shown in FIG. 4, the touch region of the touch substrate in this embodiment is provided with a first insulating layer 3, a touch electrode 7, a second insulating layer 4, a vanishing pattern 5, a touch electrode bridge 9 and a protective substrate 6 in sequence, in which an orthogonal projection of the vanishing pattern 5 on the display panel 1 covers at least a portion of an orthogonal projection of a gap between adjacent touch electrodes 7 on the display panel 1.

Figure 5:
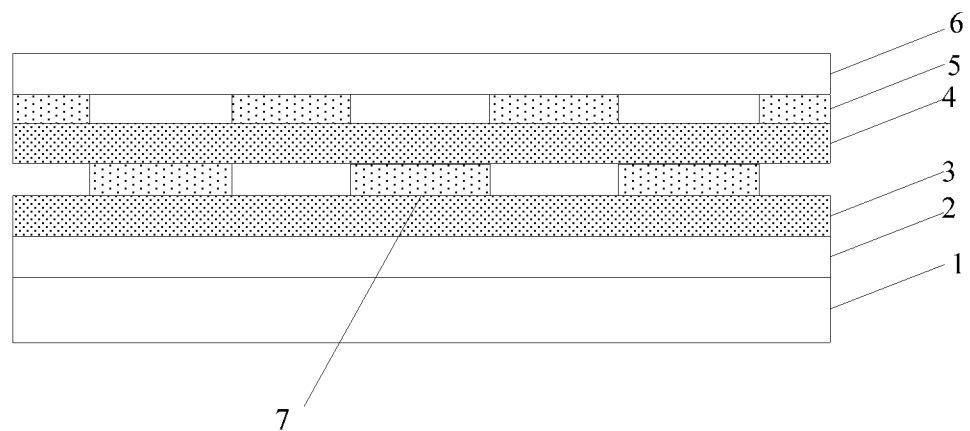
FIG. 5 is a schematic view showing a touch substrate according to another embodiment of the present disclosure.

As shown in FIG. 4, the orthogonal projection of the vanishing pattern 5 on the display panel 1 may completely cover the orthogonal projection of the gap between adjacent touch electrodes 7 on the display panel 1, and the orthogonal projection of the gap between adjacent touch electrodes 7 on the display panel 1 falls within the orthogonal projection of the vanishing pattern 5 on the display panel 1. In one example, as shown in FIG. 5, the orthogonal projection of the vanishing pattern 5 on the display panel 1 coincides with the orthogonal projection of the gap between adjacent touch electrodes 7 on the display panel 1.

In the touch substrate of this embodiment, a vanishing pattern is arranged at a gap between adjacent touch electrodes, in which the material of the vanishing pattern of the touch substrate is the same as the materials of the touch electrode and the touch electrode bridge, and they are all made of an Ag transparent composite film, such that the reflection effects at positions where external light irradiates each region of the touch substrate are same, thereby being capable of achieving a better shadow elimination effect. In the method examples of the present disclosure, the serial numbers of the steps cannot be used to define the sequence of the steps. As for one skilled in the art, the changes in the order of steps without paying creative work also fall within the scope of the present disclosure.

Unless otherwise defined, technical terms or scientific terms used herein have the normal meaning commonly understood by one skilled in the art in the field of the present disclosure. The words "first", "second", and the like used in the present disclosure does not denote any order, quantity, or importance, but rather merely serves to distinguish different components. The "including", "comprising", and the like used in the present disclosure means that the element or item appeared in front of the word encompasses the element or item and their equivalents listed after the word, and does exclude other elements or items. The word "connected" or "connecting" and the like are not limited to physical or mechanical connections, but may include electrical connections, whether direct or indirect. "On", "under", "left", "right" and the like are only used to represent relative positional relationships, and when the absolute position of the described object is changed, the relative positional relationship may also be changed, accordingly.

It will be understood that when an element, such as a layer, a film, a region, or a substrate, is referred to as being "on" or "under" another element, the element may be directly "on" or "under" another element, or there may be an intermediate element.

The above description is alternative embodiments of the present disclosure. It should be noted that one skilled in the art would make several improvements and substitutions without departing from the principles of the present disclosure. These improvements and modifications should also be regarded as the protection scope of the present disclosure.

What is claimed is:

1. A touch substrate, comprising:
   a base substrate;
   a plurality of touch electrodes on the base substrate,
   a vanishing pattern insulated from the touch electrodes,
      wherein an orthogonal projection of the vanishing pattern on the base substrate covers at least a portion of an orthogonal projection of a gap between adjacent touch electrodes on the base substrate, and a material of the vanishing pattern and a material of the touch electrodes are the same;
   an optical adhesive arranged on the base substrate;
   a first insulating layer arranged on the optical adhesive, wherein the touch electrodes are arranged on the first insulating layer;
   a second insulating layer covering the touch electrode, wherein a touch electrode bridge and the vanishing pattern are arranged on the second insulating layer; and
   a protective substrate arranged on the touch electrode bridge and the vanishing pattern.

2. The touch substrate of claim 1, wherein the touch electrodes are silver (Ag) transparent composite film.

3. The touch substrate of claim 2, wherein the orthogonal projection of the vanishing pattern on the base substrate completely covers the orthogonal projection of the gap between adjacent touch electrodes on the base substrate, and the orthogonal projection of the gap between adjacent touch electrodes on the base substrate falls within the orthogonal projection of the vanishing pattern on the base substrate.

4. The touch substrate of claim 2, wherein the orthogonal projection of the vanishing pattern on the base substrate coincides with the orthogonal projection of the gap between adjacent touch electrodes on the base substrate.

5. The touch substrate of claim 2, wherein:
   the touch substrate is a mutual-capacitive touch substrate,
      the touch substrate further comprises a touch electrode bridge;
   two adjacent touch electrodes in longitudinal direction are connected in a same layer, and two adjacent touch electrodes in transverse direction are connected by the touch electrode bridge in a different layer; and
   a material of the touch electrode bridge is the same as the material of the touch electrode.

6. The touch substrate of claim 5, wherein the touch electrode bridge and the vanishing pattern are in a same layer and insulated from each other.

7. The touch substrate of claim 5, wherein the silver (Ag) transparent composite film comprises a light-transmitting silver layer, a first transparent conductive layer covering the light-transmitting silver layer, and a second transparent conductive layer arranged between the base substrate and the light-transmitting silver layer.

8. The touch substrate of claim 7, wherein the first transparent conductive layer and the second transparent conductive layer are both made of indium tin oxide (ITO) or indium zinc oxide (IZO).

9. A method of manufacturing the touch substrate of claim 1, comprising:
    providing a base substrate;
    forming an optical adhesive on the base substrate;
    forming a first insulating layer on the optical adhesive;
    forming a plurality of touch electrodes on the first insulating layer;
    forming a second insulating layer covering the touch electrode;
    forming a touch electrode bridge and a vanishing pattern insulated from the touch electrode with a material that is the same as a material of the touch electrode on the second insulating layer, wherein an orthogonal projection of the vanishing pattern on the base substrate covers at least a portion of an orthogonal projection of a gap between adjacent touch electrodes on the base substrate; and
    forming a protective substrate on the touch electrode bridge and the vanishing pattern.

10. The method of claim 9, wherein the forming the touch electrode comprises:
    forming the touch electrode with a silver (Ag) transparent composite film.

11. The method of claim 10, wherein the touch substrate is a mutual-capacitive touch substrate, and the forming the vanishing pattern insulated from the touch electrode comprises:
    forming an insulating layer covering the touch electrode after forming the touch electrode;
    patterning the insulating layer to form a via hole exposing a portion of the touch electrode; and
    forming the vanishing pattern and a touch electrode bridge by a single patterning process on the insulating layer, wherein two adjacent touch electrodes in longitudinal direction are connected in a same layer, two adjacent touch electrodes in transverse direction are connected by the touch electrode bridge in a different layer, the touch electrode bridge is insulated from the vanishing pattern, and a material of the touch electrode bridge is the same as the material of the touch electrode.

12. The method of claim 11, wherein the forming the vanishing pattern and the touch electrode bridge by a single patterning process on the insulating layer comprises:
    forming a silver (Ag) transparent composite film on the insulating layer, and
    patterning the silver (Ag) transparent composite film to form the touch electrode bridge and the vanishing pattern.

13. The method of claim 12, wherein the forming the silver (Ag) transparent composite film on the insulating layer comprises:
    forming a second transparent conductive layer on the insulating layer;
    forming a light-transmitting silver layer on the second transparent conductive layer; and
    forming a first transparent conductive layer covering the light-transmitting silver layer, wherein the first transparent conductive layer and the second transparent conductive layer are both made of indium tin oxide (ITO) or indium zinc oxide (IZO).

14. The method of claim 10, wherein the orthogonal projection of the vanishing pattern on the base substrate completely covers the orthogonal projection of the gap between adjacent touch electrodes on the base substrate, and the orthogonal projection of the gap between adjacent touch electrodes on the base substrate falls within the orthogonal projection of the vanishing pattern on the base substrate.

15. The method of claim 10, wherein the orthogonal projection of the vanishing pattern on the base substrate coincides with the orthogonal projection of the gap between adjacent touch electrodes on the base substrate.

16. A touch substrate comprising:
    a base substrate;
    a plurality of touch electrodes on the base substrate, wherein the touch electrodes are silver (Ag) transparent composite film, and wherein the silver (Ag) transparent composite film comprises a light-transmitting silver layer, a first transparent conductive layer covering the light-transmitting silver layer, and a second transparent conductive layer arranged between the base substrate and the light-transmitting silver layer;
    a vanishing pattern insulated from the touch electrodes, wherein an orthogonal projection of the vanishing pattern on the base substrate covers at least a portion of an orthogonal projection of a gap between adjacent touch electrodes on the base substrate, and a material of the vanishing pattern and a material of the touch electrodes are the same;
    a touch electrode bridge, wherein the touch substrate is a mutual-capacitive touch substrate, wherein two adjacent touch electrodes in longitudinal direction are connected in a same layer, and two adjacent touch electrodes in transverse direction are connected by the touch electrode bridge in a different layer; and a material of the touch electrode bridge is the same as the material of the touch electrode;
    an optical adhesive arranged on the base substrate;
    a first insulating layer arranged on the optical adhesive, wherein the touch electrodes are arranged on the first insulating layer, and the second transparent conductive layer arranged between the first insulating layer and the light-transmitting silver layer;
    a second insulating layer covering the touch electrode, wherein the touch electrode bridge and the vanishing pattern are arranged on the second insulating layer; and
    a protective substrate arranged on the touch electrode bridge and the vanishing pattern.

17. A touch display device comprising the touch substrate of claim 1.

* * * * *